United States Patent
Frieden et al.

(10) Patent No.: US 9,613,165 B2
(45) Date of Patent: Apr. 4, 2017

(54) AUTOCOMPLETE SEARCHING WITH SECURITY FILTERING AND RANKING

(71) Applicant: Oracle International Corporation, Redwood Shores, CA (US)

(72) Inventors: Kurt Frieden, Woodside, CA (US); Don L. Hayler, San Francisco, CA (US); Michael Richards, Berkeley, CA (US); Vasif Shaikh, Westford, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 200 days.

(21) Appl. No.: 13/675,465

(22) Filed: Nov. 13, 2012

(65) Prior Publication Data

US 2014/0136543 A1    May 15, 2014

(51) Int. Cl.
 *G06F 17/30* (2006.01)
(52) U.S. Cl.
 CPC ............................. *G06F 17/3097* (2013.01)
(58) Field of Classification Search
 CPC ... G06F 17/30; G06F 17/3097; G06F 17/3064
 See application file for complete search history.

(56) References Cited

U.S. PATENT DOCUMENTS

| 8,204,888 | B2 | 6/2012 | Frieden et al. |
| 2003/0084039 | A1 | 5/2003 | Balogh |
| 2003/0084057 | A1 | 5/2003 | Balogh |
| 2008/0016052 | A1 | 1/2008 | Frieden |
| 2008/0016061 | A1 | 1/2008 | Frieden et al. |
| 2008/0033954 | A1* | 2/2008 | Brooks ............. G06F 17/30613 |
| 2009/0178019 | A1* | 7/2009 | Bahrs ...................... G06F 21/62 717/104 |
| 2009/0216910 | A1 | 8/2009 | Duchesneau |
| 2010/0110936 | A1 | 5/2010 | Bailey et al. |
| 2010/0169341 | A1* | 7/2010 | Hu ...................... G06F 17/3064 707/758 |
| 2011/0087644 | A1* | 4/2011 | Frieden ............. G06F 17/30144 707/706 |
| 2011/0320498 | A1* | 12/2011 | Flor .................. G06F 17/30017 707/797 |

(Continued)

OTHER PUBLICATIONS http://onjava.com/onjava/2003/10/01searchassist.html; "Search Assist Design"; last downloaded Jul. 10, 2012; pp. 1-17.

(Continued)

*Primary Examiner* — Apu Mofiz
*Assistant Examiner* — Farhad Agharahimi
(74) *Attorney, Agent, or Firm* — Miles & Stockbridge P.C.

(57) ABSTRACT

A system that provides secure autocomplete searching receives an autocomplete query from a user, the autocomplete query including a prefix of a search phrase, and retrieves security information of the user. The system searches one or more prefix indexes to find a set of matching objects, where the matching objects each include associated object security information. The system excludes matching objects that the user is not authorized to access from the set of matching objects based on the object security information and the user security information. The system then returns the set of matching objects to the user.

21 Claims, 7 Drawing Sheets

(56) References Cited

U.S. PATENT DOCUMENTS

2013/0238636 A1* 9/2013 Subramanya ....... G06F 17/3064
 707/749

OTHER PUBLICATIONS http://igoro.com/archive/efficient-auto-complete-with-a-ternary-search-tree/; "Efficiient auto-complete with a ternary search tree"; last downloaded Jul. 10, 2012; pp. 1-7.

http://suggesttree.sourceforge.net/; "Suggest Tree a Data Structure for Rank-Ordered Autocomplete Suggestions"; last downloaded Jul. 10, 2012; pp. 1-2.

M. Ingmarsson; "The Numpad Typer"; Department of Computer and Information Science Linkoping University, Sweden, 2002; LIU-KOGVET-D—Feb. 2011—SE; pp. 1-161.

G. Shani et al.; "Searching Large Indexes on Tiny Devices: Optimizing Binary Search with Character Pinning"; IUI'09, Feb. 8-11, 2009; Sanibel Island, Florida, USA; ACM978-1-60558-331-0/09/02; pp. 257-265.

http://www.lucidimagination.com/devzone/videos-podcasts/podcasts/interview-walter-underwood; G. Ingersoll; "Interview with Walter Underwood of Netflix"; last downloaded Jul. 10, 2012.

B. Schlegel et al.; "Memory-Efficient Frequent-Itemset Mining"; EDBT 2011, Mar. 22-24, 2011; Uppsala, Sweden; ACM 978-1-4503-0528-0/11/0003.

G. Badr et al.; "Self-Adjusting of Ternary Search Tries Using Conditional Rotations and Randomized Heuristics"; 2005.

http://blog.hackthology.com/ternary-serach-tries-for-fast-flexible-string; T. Henderson; "Hack Thology Ternary Search Tries for Fast Flexible String Search: Part 1"; Jun. 2, 2011; pp. 1-7.

D. Matani; "An O(k log n) algorithm for prefix based ranked autocomplete"; Sep. 2, 2011; pp. 1-14.

J. Bentley et al.; "Fast Algorithms for Sorting and Searching Strings"; Bell Labs, Lucent Technologies, Murray Hill, NJ 07974; 1997.

* cited by examiner

AUTOCOMPLETE SEARCHING WITH SECURITY FILTERING AND RANKING

FIELD

One embodiment is directed generally to computer-based text searching, and in particular to computer-based text searching that includes autocomplete.

BACKGROUND INFORMATION

Autocomplete and instant search have become increasingly common with text entry and online search engines. Autocomplete is a computerized scheme for predicting and providing a complete word or search phrase that a user wants to type based on a few letters of the word or phrases that are typed in by the user. Autocomplete functionality is commonly implemented in web browsers, e-mail programs, search engine interfaces, source code editors, database query tools, word processors, command line interpreters, etc. Instant search refers to a computerized scheme for displaying search results of a search phrase while the user types the search phrase.

Online search services often offer both autocomplete and instant search functionalities. Autocomplete and instant search are often used together, and online search services strive to more quickly provide more accurate autocomplete suggestions and instant search results. Autocomplete and instant search in general are considered "instant" because they provide responses after each entered character.

SUMMARY

One embodiment is a system that provides secure autocomplete searching. The system receives an autocomplete query from a user, the autocomplete query including a prefix of a search phrase, and retrieves security information of the user. The system searches one or more prefix indexes to find a set of matching objects, where the matching objects each include associated object security information. The system excludes matching objects that the user is not authorized to access from the set of matching objects based on the object security information and the user security information. The system then returns the set of matching objects to the user.

DETAILED DESCRIPTION

One embodiment provides secure autocomplete services. When one or more letters of a complete search phrase are received from a user, indexes are searched to find objects that match the letters. Then, the matching objects are checked to see if they include a secured object that the user is not authorized to see. If such secured object is included in the matching objects, the secured object is excluded from the matching objects, which are then returned to the user. Therefore, it is possible to provide autocomplete services to the user without revealing any sensitive information that the user is not authorized to see.

Figure 1:
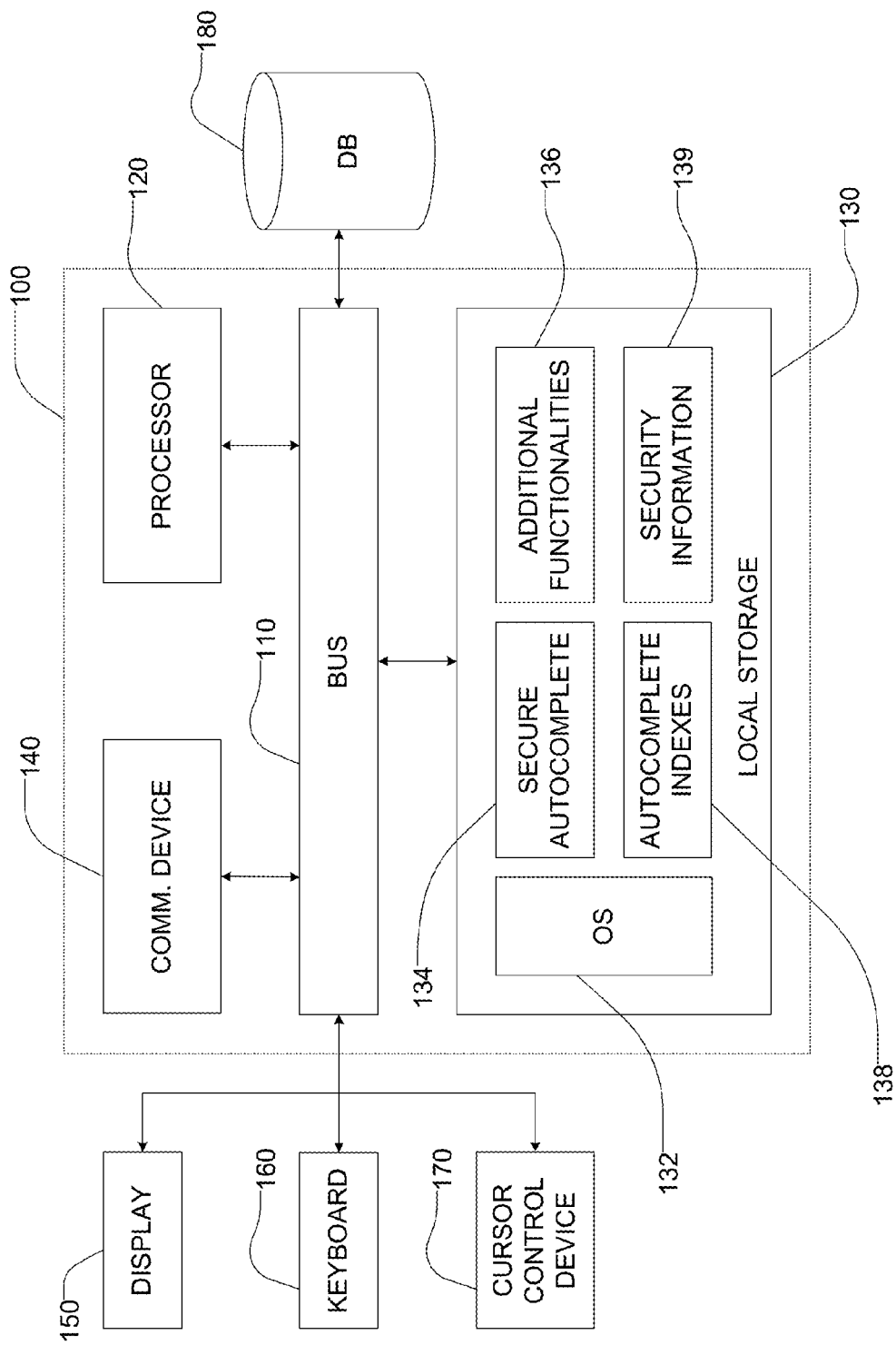
FIG. 1 illustrates a block diagram of a computer system that can implement an embodiment of the present invention.

FIG. 1 illustrates a block diagram of a computer system 100 that can implement an embodiment of the present invention. Although shown as a single system, the functionality of system 100 can be implemented as a distributed system. System 100 includes a bus 110 or other communication mechanism for communicating information, and a processor 120 coupled to bus 110 for processing information. Processor 120 can be any type of general or specific purpose processor. System 100 further includes a local storage (or local memory) 130 for storing information and instructions to be executed by processor 120. Local storage 130 may be comprised of any combination of random access memory ("RAM"), read only memory ("ROM"), static storage such as a magnetic or optical disk, or any other type of computer readable media. Computer readable media can be any available media that can be accessed by processor 120 and includes both volatile and nonvolatile media, removable and non-removable media, and communication media. The communication media includes computer readable instructions, data structures, program modules or other data in a modulated data signal such as a carrier wave or other transport mechanism and includes any information delivery media.

System 100 further includes a communication device 140, such as a network interface card, to provide access to a network. Therefore, a user may interface with system 100 directly, or remotely through a network or any other method.

Processor 120 may be further coupled via bus 110 to a display 150, e.g., a Liquid Crystal Display ("LCD"), etc., for displaying information to the user. A keyboard 160 and a cursor control device 170 (e.g., computer mouse) is further coupled to bus 110 to enable the user to interface with system 100.

In one embodiment, local storage 130 stores software modules that can provide functionality when executed by processor 120. The modules include an operating system ("OS") 132 that can provide OS functionality for system 100. The modules also include modules related to secure autocomplete/instant search functionality, including secure autocomplete module 134, one or more autocomplete indexes 138 and security information 139, as disclosed in more detail below. System 100 can be part of a larger system, such as a computer network system 200 shown in FIG. 2. System 100 can include one or more additional functional modules 136 to include additional functionality, such as enterprise resource planning ("ERP") applications. System 100 can be connected to database 180 that provide centralized storage for the content of autocomplete indexes 138 and security information 139 to carry out secure autocomplete services, which are described below in detail. Database 180 may be local to system 100, or accessed through a network.

Figure 2:
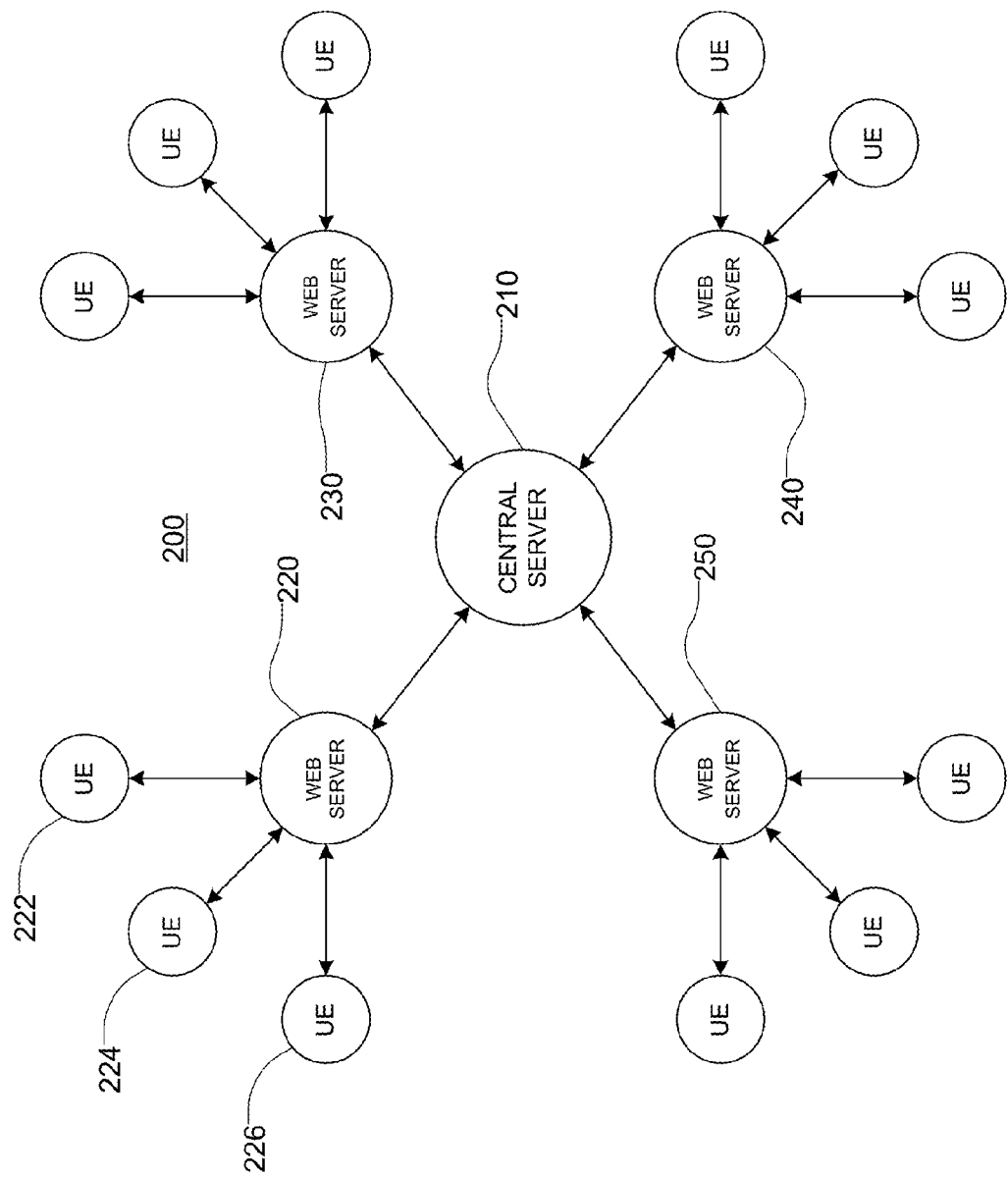
FIG. 2 illustrates a computer network system that can implement an embodiment of the present invention.

FIG. 2 illustrates computer network system 200 that can implement an embodiment of the present invention. Network system 200 comprises a central server 210 and a number of web servers 220, 230, 240, 250 connected to central server 210. Each web server is also connected to a number of user equipment devices ("UE"). For example, in FIG. 2, web server 220 is connected to UE 222, 224, 226. A UE can be any type of device that allows a user to access its corresponding web server, including a client computer, tablet, smartphone, etc. In one embodiment, a UE implements a browser and communicates with its corresponding web server over the Internet.

According to an embodiment, central server 210, web server 220 and/or any of the UEs shown in FIG. 2 are implemented with at least a portion of computer system 100 shown in FIG. 1. Some elements of system 100 may not be included or needed in some embodiments. For example, a server will likely not need and may not have a cursor control device 170, keyboard 160 or display 150 or any other elements that are more suited for an end user. As noted above, local storage 130 of system 100 for web server 220 stores one or more autocomplete indexes 138. In an embodiment, each of autocomplete indexes 138 is implemented with a ternary search tree ("TST"), which has a specialized structure for storing character strings to enable rapid searching by prefix and to facilitate the rapid searching, indexes 138 are stored and maintained in high speed memory such as RAM rather than slower memory such as disks. A TST is a ternary tree where the nodes are in order with respect to the search keys. A TST has at most three children per parent node. If the search keys are strings, each node stores a single character and searching for a string consists of a series of ternary searches, one for each character in the string with specific rules. To query a search phrase, a prefix of the search phrase is walked through the nodes. Once the end of the search prefix node is found, all of the nodes below the search prefix node are returned.

The TST can be used to index the content or metadata associated with searchable objects in the system. The TST may contain multiple entries for each such object (e.g., first name, last name). Each entry corresponds to a searchable string and contains directly, or by reference, additional object meta data which can be returned when the entry is matched, (e.g., icon, description, etc.). Since the TST may contain more than one entry for the same system object, one embodiment externalizes the object metadata in a separate in-memory data structure to optimize searching. In this case, each TST end node contains a reference to an entry in the object metadata list.

Figure 3:
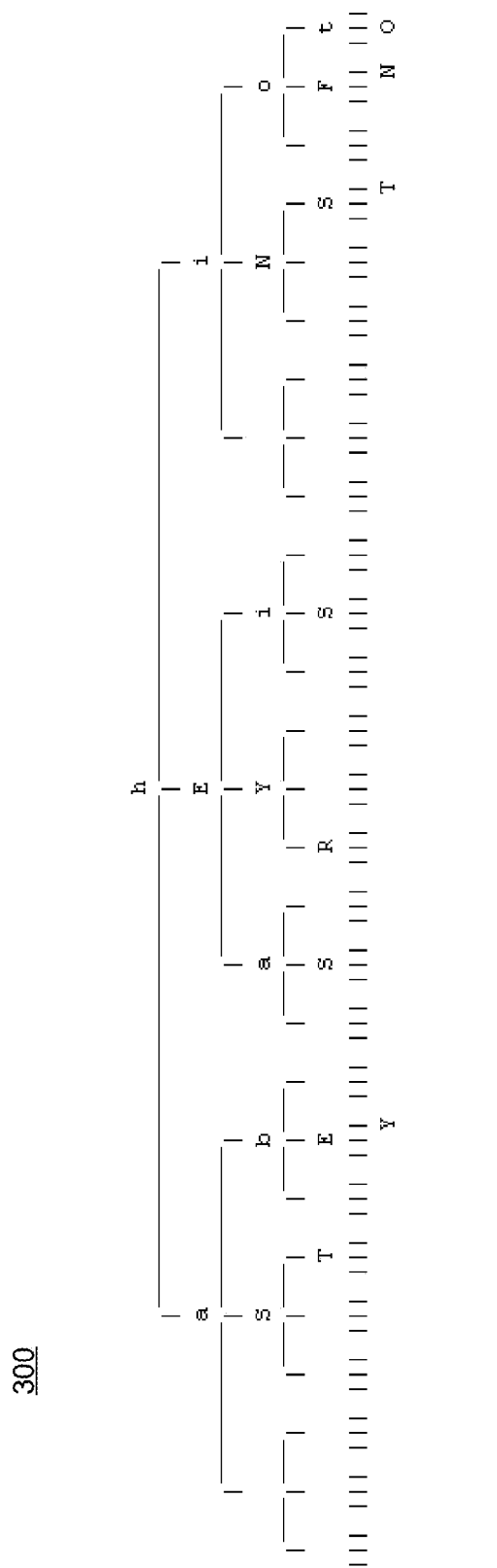
FIG. 3 illustrates an example of a ternary search tree that can implement an embodiment of the present invention.

FIG. 3 illustrates an example of a TST 300 for searching phrases according to an embodiment of the present invention. In an embodiment, a rank of each word or object that results in the end node is stored in the TST node that is associated with the result. Then, the results are ordered while collecting the nodes below the specified search prefix node, and the results are ordered by rank. Further, the TST is able to return a set of matches for a given prefix because it is structured in a way that all sub-trees of a node are guaranteed to share a prefix.

Figure 4:
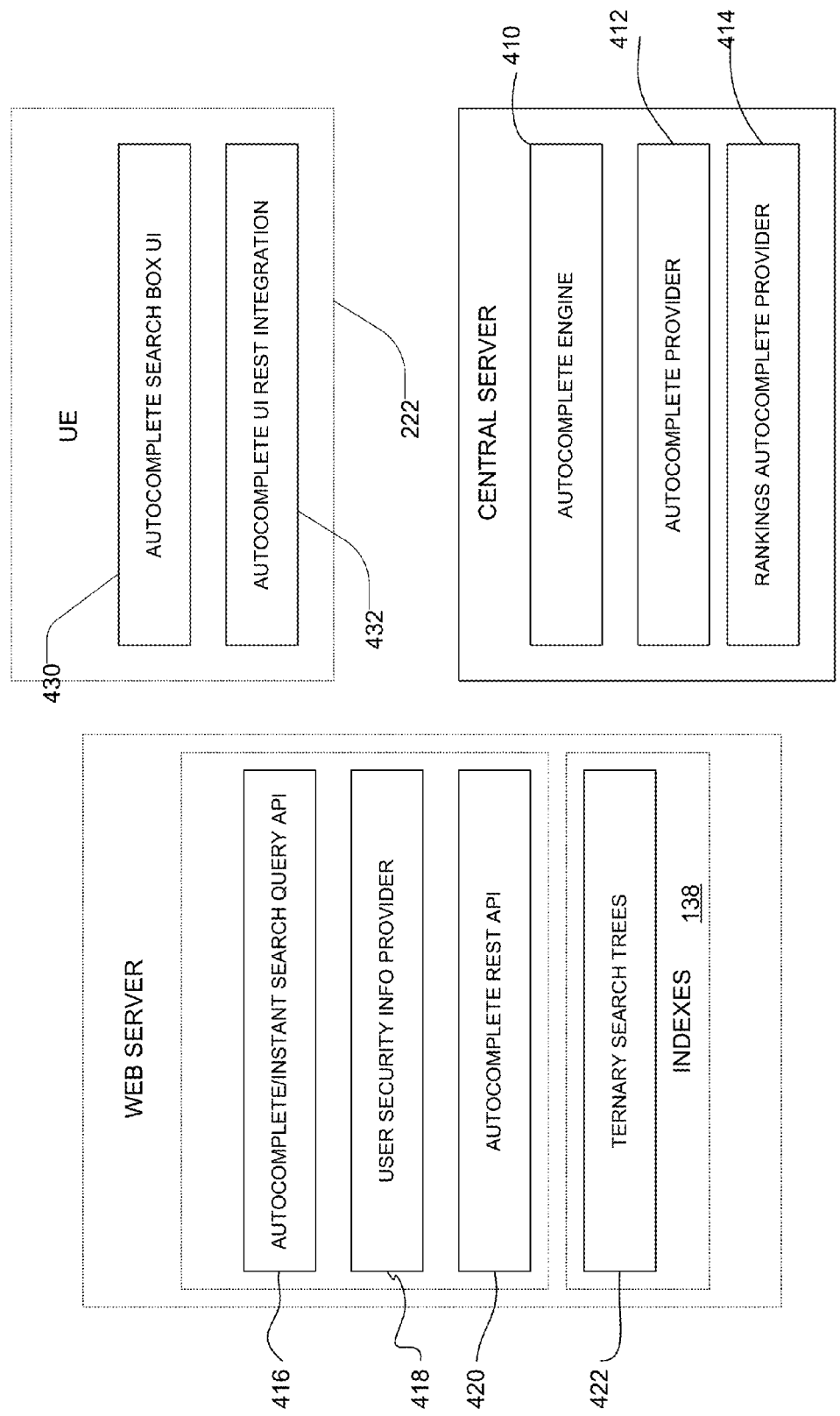
FIG. 4 illustrates an example of components of the computer system shown in FIG. 1 and user equipment shown in FIG. 2 that can implement an embodiment of the present invention.

As shown in FIG. 4, in an embodiment of the present invention, secure autocomplete module 134 includes a number of modules for secure autocomplete/instant search functionality, depending on whether module 134 is located on a web server, the central server, or a UE. For example, central server 210 includes autocomplete engine 410, autocomplete provider 412 and rankings autocomplete provider 414. Any of web servers 220, 230, 240 or 250 include autocomplete/instant search query API 416, user security info provider 418 and autocomplete Representational State Transfer ("REST") API 420. Also, each index 138 is comprised of a TST 422 and is stored locally on the web server after being generated by the central server.

Autocomplete engine 410 runs pluggable providers which convert raw data into autocomplete data used to create indexes 138. Autocomplete provider 412 queries a search engine and indexes for object information, including security metadata and rank that is provided into the indexes. In one embodiment, the search engine is an enterprise search engine for searching enterprise data such as ERP data that includes secure data and documents. Secure data and documents are data and documents that should only be shown to users authorized to view the data, such as users on an access control list that may be based on the role of the user. Rankings autocomplete provider 414 queries databases including a ranking database for information that is not stored in the search engine, such as search phrases. The ranking database gathers data from a variety of sources and runs calculations on the gathered data to determine the importance of objects (documents, people, etc.).

Autocomplete/instant search query API 416 is used to retrieve results from TST 422. Autocomplete/instant search query API 416 also handles ordering results by rank and security filtering. Upon starting up or being instructed to reload, autocomplete/instant search query API 416 loads indexes 138 from the results generated by autocomplete engine 410. In one embodiment, indexes 138 are loaded it into the local memory space of the web server. Indexes 138 are constructed as relatively small indexes with the most relevant content in order to make maximal use of high speed storage (i.e., RAM) of the web server, as opposed to search structures in slower-speed storage as is done by traditional search engines. User security info provider 418 retrieves security information 139 for the current user to be used in filtering query results. REST API 420 provides access to autocomplete query API 416 from user interface ("UI") components (e.g., AJAX UI, etc.), of user equipment (e.g., UE 222). Autocomplete REST API 420 is exposed from each consuming application. TST 422 implements indexes 138 stored in local storage 130. TST 422 is produced by engine 410 and is queried for search results, including results filtered by rank and security.

The user equipment (e.g., UE 222) implements an autocomplete search box UI 430, autocomplete UI REST integration 432, etc. In an embodiment, autocomplete search box UI 430 is an AJAX JavaScript widget that is integrated into a client application and customized to display autocomplete/instant search results. In an embodiment, autocomplete search box UI 430 uses an external UI component. Autocomplete UI REST integration 432 allows a browser of UE 222 to call autocomplete REST API 420 and format the results for use in autocomplete search box UI 430.

Referring again to FIG. 2, in one embodiment the TST/index is constructed/generated by autocomplete engine 410 and stored in central server 210, and then retrieved by each web server when completed. Each web server will check if a new index is ready by, for example, checking for a ready "flag", and then loads the new index in its local memory. The TST will be persisted to the database as a binary large object ("BLOB") once it is prepared by autocomplete engine 410. Autocomplete query API 416 will load the TST into the local memory space of the web server from the database on initialization. The TST needs to be reloaded into local memory every time the TST is reconstructed and persisted in the database. In one embodiment, the TST will be persisted with timestamp information. Autocomplete provider 412 will compare the timestamp of the in-memory tree to the database periodically to determine if the TST needs to be refreshed. Therefore, embodiments of the present invention build the index in one server-side process by calling a registered set of providers and accesses it in a different server-side process (i.e., the web server).

In operation, autocomplete provider 412 pulls event data and ranks into TST 422, and then outputs the event data and ranks to database 180 as a BLOB. Autocomplete/instant search query API 416 is then initialized, and pulls in the BLOB from database 180 and converts the BLOB into "in-memory" TST 422. Autocomplete search box UI 430 and autocomplete UI REST integration 432 are initialized in response to user actions, and in response to text entries starts querying autocomplete REST API 420, which calls autocomplete/instant search query API 416 for autocomplete and instant search matches. Autocomplete/instant search query API 416 searches for the typed letter in TST 422 and returns possible completions and instant search results. Autocomplete query/instant search API 416 orders the possible completions and instant search results by rank and filters for security and/or scope. Autocomplete REST API 420 decorates the results with appropriate data and links for the consuming application if necessary. The user then selects an autocomplete or instant search suggestion, which either runs the search on the selected string, takes the user to the object page, fills out a form field, or executes an additional command, depending on the UI integration.

In an embodiment, secure autocomplete module 134 and indexes 138 use externally calculated relevance ranking and static activity-based ranks to return the most important results. When a result is stored as a node in index 138, the node contains the static activity-based rank for the result. When the index for the result is queried, the query algorithm first locates the node for the query prefix and then creates a list of all possible result nodes stored under the query prefix node. This list is then sorted by static activity-based ranks and the result nodes with the highest rank are returned as the results. Also, secure autocomplete module 134 can use static activity-based ranks to preferentially use high-ranking results when building indexes 138 that are limited in size. When a result is stored as a node in an index, that node contains the static activity-based rank for the result. Activity ranks can be determined using known activity ranks methods, for example as disclosed in U.S. Pat. Pub. No. 2008/0016052, entitled "Using Connections Between Users and Documents to Rank Documents in an Enterprise Search System" or U.S. Pat. Pub. No. 2011/0087644, entitled "Enterprise Node Rank Engine". Because the rank is stored in the end node, embodiments use the ranks after the search is complete for sorting purposes, etc.

In one embodiment, when an index reaches a predetermined maximum memory limit, additional results are added to the index only when the additional results can replace the existing lower-ranked results in the index. This can be accomplished by searching the index for low-ranking results, maintaining a list of the lowest-ranked results, or by maintaining a metadata list external to the index that is sorted or indexed by rank. Also, indexes 138 are configured to have an adjustable maximum size limit in order to keep indexes 138 from using up too much storage space of local storage 130. When this limit is reached, autocomplete engine 410 starts ignoring lower ranked results in favor of higher ranked results when indexes 138 are being built, which is referred to as "pruning."

Although elements 410, 412, 414, 416, 418 and 420 are all shown in FIG. 4 as part of a single secure autocomplete module 134, in other embodiments each of these elements can be separated from the other elements, and executed by separate computers/servers than the other elements. For example, in one embodiment Autocomplete Engine 410, Autocomplete Provider 412 and Rankings Autocomplete Provider 414 are part of a separate module, such as a "Secure Autocomplete Engine Module", and are executed on a different server than the remaining elements of module 134. In this embodiment, "Secure Autocomplete Engine Module" runs on the separate server (e.g., central server 210 of FIG. 2) and generates the indexes which are then pushed out to the web servers (e.g., web servers 220, 230, 240 and 250 of FIG. 2).

Figure 5:
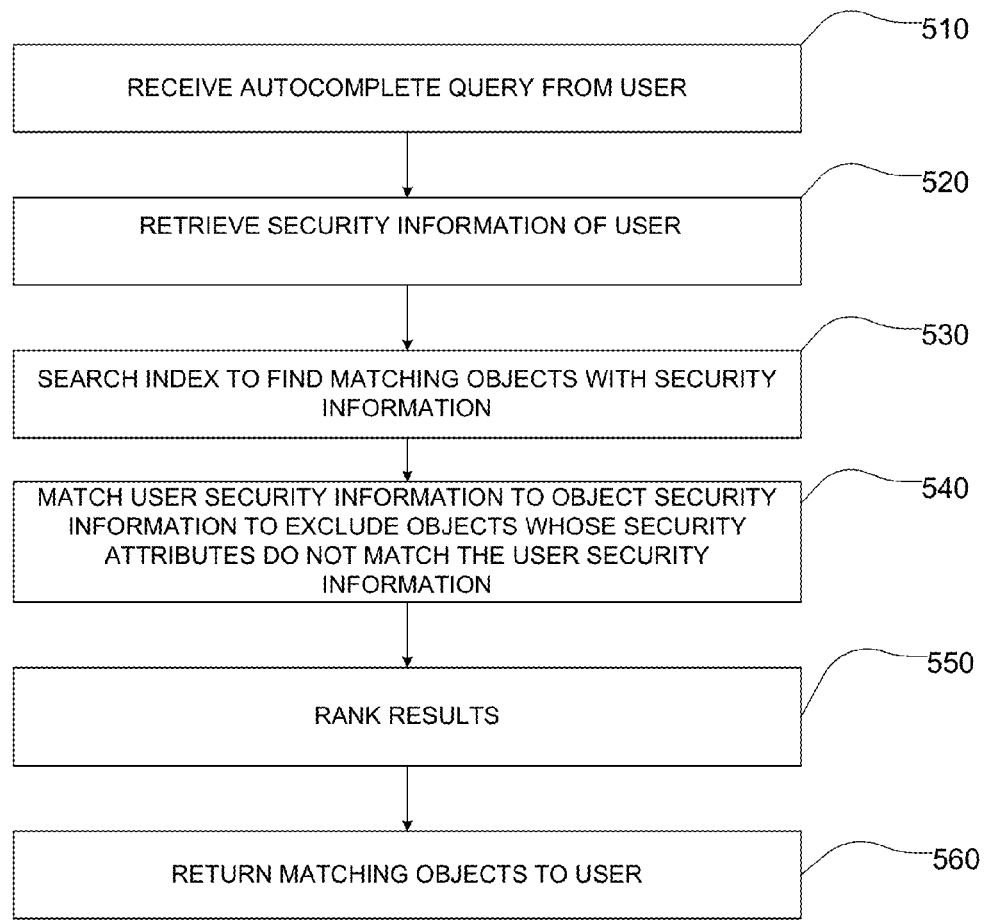
FIG. 5 illustrates a flow diagram of functionality of a secure autocomplete module of the computer system shown in FIG. 1 that can implement an embodiment of the present invention.

FIG. 5 is a flow diagram of functionality of secure autocomplete module 134 that can implement an embodiment of the present invention. In one embodiment, the functionality of the flow diagram of FIG. 5, and FIG. 6 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 510, web server 220 receives an autocomplete query from a user of UE 222. The user can send an autocomplete query by typing one or more letters and/or characters, which is referred to as a prefix, of a search phrase on a web browser.

In one embodiment, objects are stored in autocomplete indexes 138 with a list of security information stored under a security key. The security information can be in the form of access control lists ("acl") in an enterprise system. For example, a security key "doc-acl=admin,moderator,Vicki" indicates roles (e.g., "admin" and "moderator") and a user (e.g., "Vicki") that have permission to view the particular object. Objects may have multiple security keys. In one embodiment, where the searching is done within an enterprise system, the matching objects may include one or more objects that the particular user is not authorized to see, which is referred to as secured objects. To prevent a secured object from being returned to the user, autocomplete module 134 runs a security check on each matching object to determine whether the user is authorized to see the particular matching object. Therefore, at 520, user security info provider 418 retrieves security information 139 (e.g., acl) of the user.

At 530, secure autocomplete module 134 searches indexes 138 to find indexes that contain matching objects with security information. As noted above, the objects can be autocomplete phrases for online searches. The objects can also be topics, documents, people, appointments, etc. In an embodiment, the objects of different categories are stored in different indexes to enable a "scoped" search, as described in detail below.

At 540, user security information is matched to object security information to exclude objects whose security attributes do not match the user security information. For example, only objects that have security information that indicate that the object is accessible by the user will be retained, and the remaining unmatched objects are excluded from the set of matched objects at 530 from the index search.

At 550, the objects from 540 are optionally ranked. As disclosed above, in one embodiment static activity-based ranking is used to rank the results At 560, the matching objects are returned to the user as suggestions for autocomplete or instant search. The matching objects can be ranked and exclude security mismatches (i.e., objects that have security information that does not match the user's security information). Therefore, according to embodiments of the present invention, it is possible to provide autocomplete suggestions to users without revealing any non-authorized information for that user.

In an embodiment, an object's security attribute is stored as a security key. For example, a security key "doc-acl=admin,Vicki" indicates the user's roles that can fulfill the document access control list security check. If an object's security key contains no data, the object is treated as having public visibility. If a user's security key contains no data, the user is only allowed to see objects that have public visibility. If both security keys of a user and an object have lists, there may be at least one match between both lists. For example, an object's security key "admin,Vicki" matches a user's security key "Vicki,moderator". If an object has multiple security keys, the value list for each security key may have a match for a user to see the object (i.e., must have matches for both container-id and acl security keys). Matches between values in the two lists are configurable to be exact or prefix matches (e.g., vicki matches vicki vs. vicki matches vicki_the_great).

According to an embodiment, secure autocomplete module 134 can also be configured to provide "scoped" instant search. For example, objects are stored in indexes 138 with a list of scope metadata information, which can be stored as key value pairs. For example, a key value pair "folder=my_folder/your_folder" specifies that the object is stored in the listed path. An object can have multiple scope metadata pairs. When a user queries for scoped objects, the API passes in a list of scope metadata key value pairs. For each possible matching object, the query runs a scope check. If an object does not have all of the scope metadata values specified in the query, the object will not be returned. Matches between the query and object values are configurable to be exact or prefix matches (e.g., my_folder matches my_folder vs. my_folder matches my_folder/your_folder).

Indexes 138 use a small amount of memory per result. However, instant search results can use more memory, especially if search results are secured or setup for scoped instant search. In order to keep "in-memory" indexes 138 from using up too much memory, indexes 138 can have a configurable maximum size limit. When this limit is reached, secure autocomplete module 134 starts ignoring lower ranked results in favor of higher ranked ones when building autocomplete indexes 138, which is referred to as "pruning."

Figure 6:
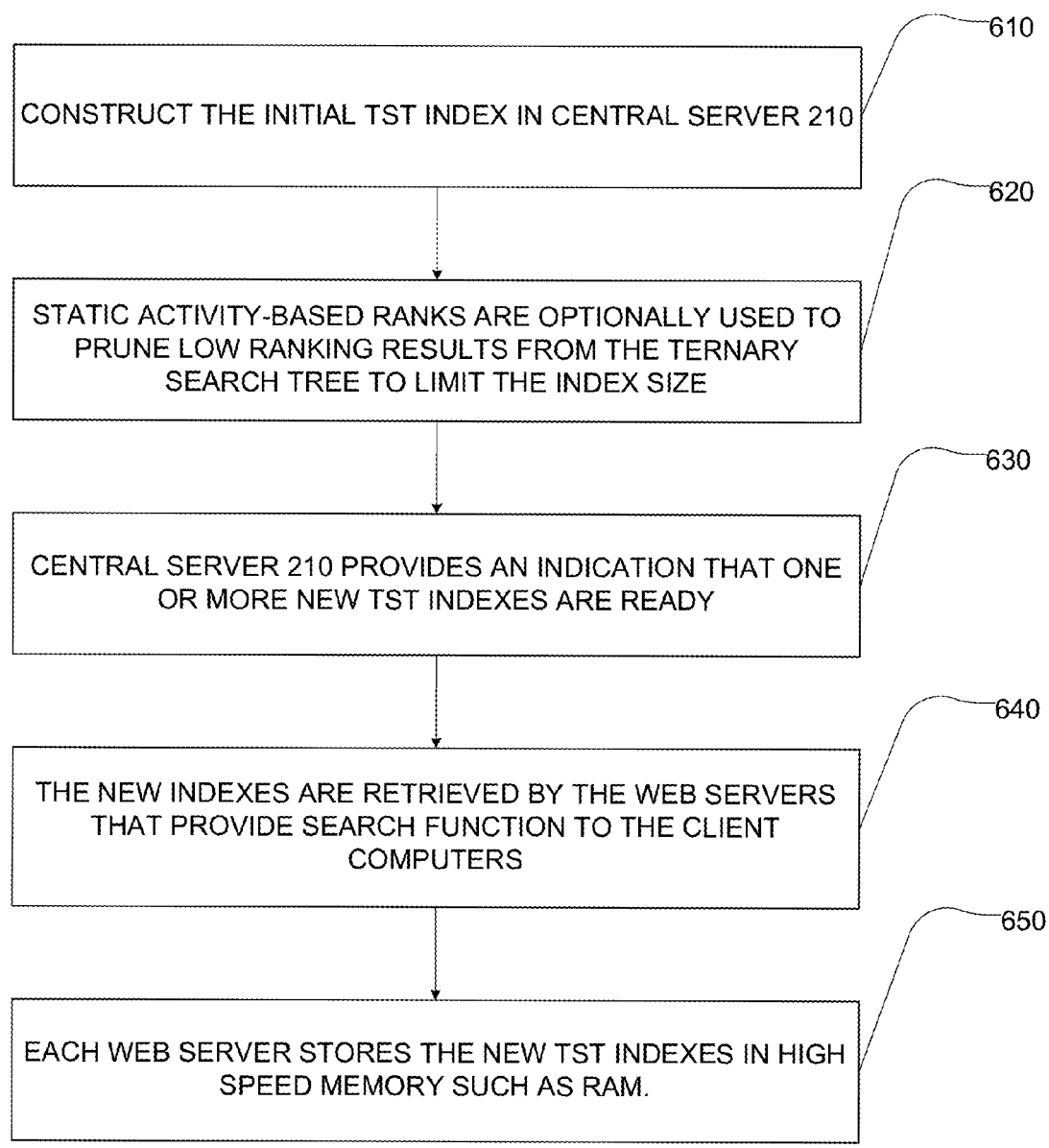
FIG. 6 is a flow diagram of the functionality of the autocomplete engine and the web servers when a ternary search tree index is constructed/generated in accordance to one embodiment.

FIG. 6 is a flow diagram of the functionality of autocomplete engine 410 and the web servers when a TST index is constructed/generated in accordance to one embodiment.

At 610, the initial TST index is constructed in central server 210 of FIG. 2.

At 620 static activity-based ranks are optionally used to prune low ranking results from the ternary search tree to limit the index size.

At 630, central server 210 provides an indication that one or more new TST indexes are ready.

At 640, the new indexes are retrieved by the web servers that provide search function to the client computers, such as web servers 220, 230, 240 and 250 of FIG. 2.

At 650, each web server stores the new TST indexes in high speed memory such as RAM. The indexes provide search functionality for the client computers, such as query results, while remaining in the high speed memory.

Figure 7:
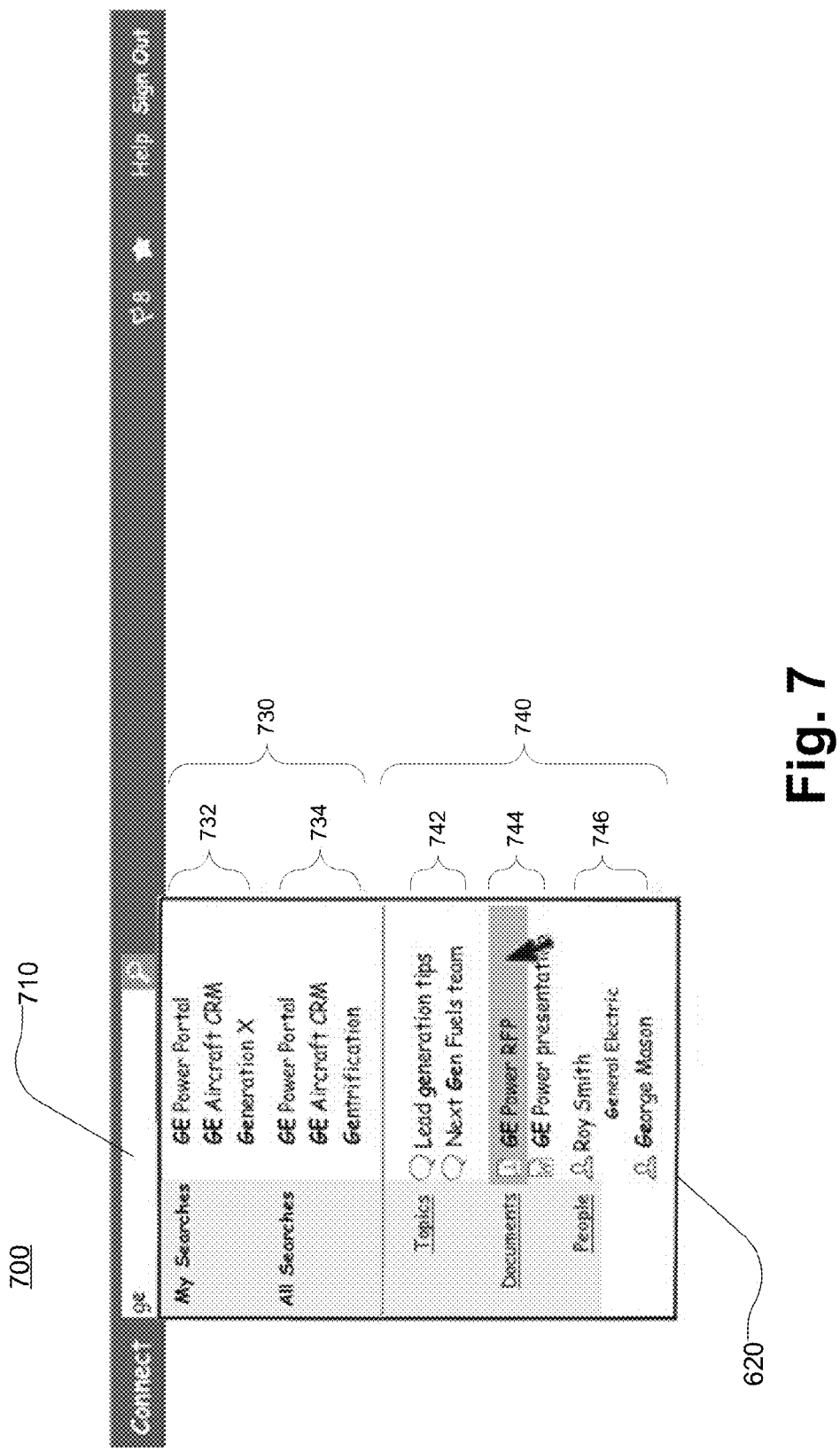
FIG. 7 illustrates an example of a user interface that can implement an embodiment of the present invention.

FIG. 7 illustrates an example of a user interface ("UI") 700 for autocomplete and instant search according to an embodiment of the present invention. UI 700 includes a search field 710, where user can type in a prefix (e.g., "ge") of a search phrase that he or she wants to search (e.g., "GE Power RFP"). The search phrase could be either of a search term, a topic name, a document name, a person's name, etc. When the prefix "ge" is typed in, a pull-down menu 720 is displayed. Top portion 730 of menu 720 shows matching autocomplete phrases. In an embodiment, top portion 730 shows private matching search phrases 732 (e.g., "GE Power Portal", "GE Aircraft CRM", "Generation X", etc.) that are ordered so that the most recent appear at the top. By clicking one of the phrases, a full-text search of the phrase can be performed. Top portion 730 also shows public matching search phrases 734 (e.g., "GE Power Control", "GE Aircraft CRM", "Gentrification", etc.), which are ordered by activity-based ranks where the rank of a phrase may depend on the number and ranks of the results that the phrase led to.

In one embodiment, scoped search can be implemented by passing in metadata as disclosed above. In another embodiment, scoped search can be achieved by searching separate indexes. For example, a bottom portion 740 of menu 720 shows "scoped" search results. More specifically, the search prefix "ge" is used to find objects in different indexes, for example, "Topic" index, "Document" index and "People" index. The matching objects from each index are displayed next to "topics," "documents" and "people" headers. When a user clicks the header, a full-text "scoped" search can be performed on the corresponding index only. Non-name attributes (e.g., tags) only appear if they match the search phrase. Items containing tags that the user added appears at the top of their categories if the tags match the search phrase entered by the user.

Therefore, according to the present application, an index is implemented with a ternary search tree and stored in a local storage. Also, security attributes, which can be stored in result nodes of a ternary search tree, are used to return only the objects that a particular user is authorized to see. Further, autocomplete suggestions and instant results are ordered based on static activity-based ranks, which can also be used to prune low ranking results from the ternary search tree to limit the index size.

Further, an off-line process on a remote server is implemented which calls registered providers to gather the data to be indexed, builds the data structure, and serializes it to a database. Applications then query the database periodically to see when a new index is ready. When one is ready, the application loads the TST into local memory. Security attributes are stored in the result nodes of the TST and are used to return only the results the end user is authorized to see. Static activity-based ranks are incorporated into the ordering of search suggestions and instant search results. Static ranks are used to prune low ranking results from the tree when the amount of memory the indexes can use is limited.

Several embodiments are specifically illustrated and/or described herein. However, it will be appreciated that modifications and variations of the disclosed embodiments are covered by the above teaching and within the purview of the appended claims without departing from the spirit and intended scope of the invention.

What is claimed is:

1. A non-transitory computer-readable medium having instructions stored thereon that, when executed by a processor, cause the processor to provide secure autocomplete searching, the autocomplete searching comprising:
   receiving an autocomplete query from a user, the autocomplete query comprising a prefix of a search phrase;
   retrieving security information of the user;
   searching one or more prefix indexes to find a set of matching autocomplete phrase objects, wherein the matching autocomplete phrase objects each comprise associated object security information, wherein each of the prefix indexes comprise a search tree comprising a plurality of nodes, the plurality of nodes comprising a result node that includes the object security information;
   excluding matching autocomplete phrase objects that the user is not authorized to access from the set of matching autocomplete phrase objects, wherein the excluding is based on the object security information and the user security information; and
   displaying the set of matching autocomplete phrase objects to the user, the set of matching autocomplete phrase objects comprising autocomplete search phrases based on the prefix.

2. The computer readable medium of claim 1, further comprising:
   ranking the set of matching autocomplete phrase objects before returning the set of matching autocomplete phrase objects to the user.

3. The computer readable medium of claim 1, wherein the search tree comprises a ternary search tree.

4. The computer readable medium of claim 3, wherein one or more nodes of the ternary search tree are associated with the object security information.

5. The computer readable medium of claim 2, the ranking comprises: incorporating an externally calculated relevance ranking into the set of matching autocomplete phrase objects before returning the set of matching autocomplete phrase objects to the user, the plurality of nodes comprising a second result node that includes the ranking.

6. The computer readable medium of claim 2, further comprising pruning autocomplete phrase objects having low rankings from the one or more prefix indexes.

7. The computer readable medium of claim 1, wherein the one or more prefix indexes are generated at a central server and are retrieved when an indication is generated that new indexes are available, wherein the indexes are retrieved by a search server that receives the autocomplete query from a user.

8. The computer readable medium of claim 7, wherein the retrieved prefix indexes are stored by the search server in high speed memory, and wherein the searching is performed while the prefix indexes are stored in the high speed memory.

9. A method for providing secure autocomplete searching, the method comprising:
   receiving an autocomplete query from a user, the autocomplete query comprising a prefix of a search phrase;
   retrieving security information of the user;
   searching one or more prefix indexes to find a set of matching autocomplete phrase objects, wherein the matching autocomplete phrase objects each comprise associated object security information, wherein each of the prefix indexes comprise a search tree comprising a plurality of nodes, the plurality of nodes comprising a result node that includes the object security information;
   excluding matching autocomplete phrase objects that the user is not authorized to access from the set of matching autocomplete phrase objects, wherein the excluding is based on the object security information and the user security information; and
   displaying the set of matching autocomplete phrase objects to the user, the set of matching autocomplete phrase objects comprising autocomplete search phrases based on the prefix.

10. The method of claim 9, further comprising:
    ranking the set of matching autocomplete phrase objects before returning the set of matching autocomplete phrase objects to the user, the plurality of nodes comprising a second result node that includes the ranking.

11. The method of claim 9, wherein the search tree comprises a ternary search tree.

12. The method of claim 11, wherein one or more nodes of the ternary search tree are associated with the object security information.

13. The method of claim 10, wherein the ranking comprises activity-based ranking.

14. The method of claim 10, further comprising pruning autocomplete phrase objects having low rankings from the one or more prefix indexes.

15. The method of claim 9, wherein the one or more prefix indexes are generated at a central server and are retrieved when an indication is generated that new indexes are available, wherein the indexes are retrieved by a search server that receives the autocomplete query from a user.

16. The method of claim 15, wherein the retrieved prefix indexes are stored by the search server in high speed memory, and wherein the searching is performed while the prefix indexes are stored in the high speed memory.

17. An autocomplete system comprising:
    a processor;
    a computer readable memory storing modules that are adapted to be executed by the processor to generate autocomplete searching in response to receiving an autocomplete query from a user, the autocomplete query comprising a prefix of a search phrase, the modules comprising:
    an autocomplete index module comprising one or more prefix indexes;
    a security information module that retrieves security information of the user;
    a secure autocomplete module that searches the one or more prefix indexes to find a set of matching autocomplete phrase objects, wherein the matching autocomplete phrase objects each comprise associated object security information, and excludes matching autocomplete phrase objects that the user is not authorized to access from the set of matching autocomplete phrase objects, wherein the excluding is based on the object security information and the user security information, wherein each of the prefix indexes comprise a search tree comprising a plurality of nodes, the plurality of nodes comprising a result node that includes the object security information; and
    a user interface module that displays the set of matching autocomplete phrase objects to the user, the set of matching autocomplete phrase objects comprising autocomplete search phrases based on the prefix.

18. The autocomplete system of claim 17, wherein at least a portion of the computer readable memory is high speed memory, wherein the prefix indexes are stored in the high speed memory.

19. The autocomplete system of claim 17, the modules further comprising:
a ranking module the ranks the set of matching autocomplete phrase objects using activity-based ranking before returning the set of matching objects to the user, the plurality of nodes comprising a second result node that includes the ranking.

20. The autocomplete system of claim 17, wherein the search tree comprises a ternary search tree and wherein one or more nodes of the ternary search tree are associated with the object security information.

21. The computer readable medium of claim 5, wherein the ranking comprises activity-based ranking.

* * * * *

UNITED STATES PATENT AND TRADEMARK OFFICE
CERTIFICATE OF CORRECTION

| | | |
|---|---|---|
| PATENT NO. | : 9,613,165 B2 | Page 1 of 1 |
| APPLICATION NO. | : 13/675465 | |
| DATED | : April 4, 2017 | |
| INVENTOR(S) | : Frieden et al. | |

It is certified that error appears in the above-identified patent and that said Letters Patent is hereby corrected as shown below:

On the Title Page

On page 2, Column 1, under Other Publications, Line 2, delete ""Efficiient" and insert -- "Efficient --, therefor.

In the Specification

In Column 7, Line 3, after "results" insert -- . --.

Signed and Sealed this
Third Day of October, 2017

Joseph Matal
*Performing the Functions and Duties of the*
*Under Secretary of Commerce for Intellectual Property and*
*Director of the United States Patent and Trademark Office*